UNITED STATES PATENT OFFICE.

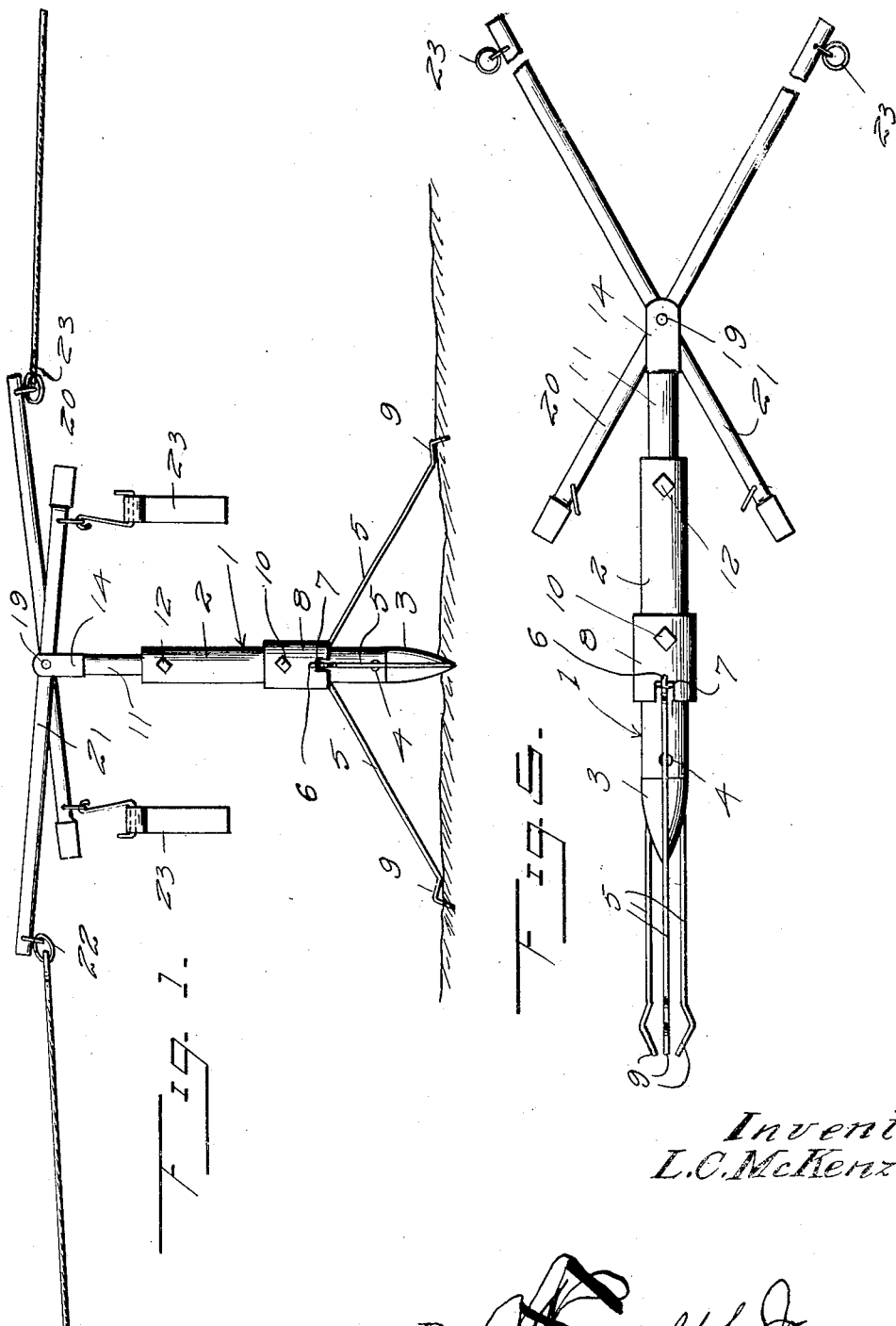

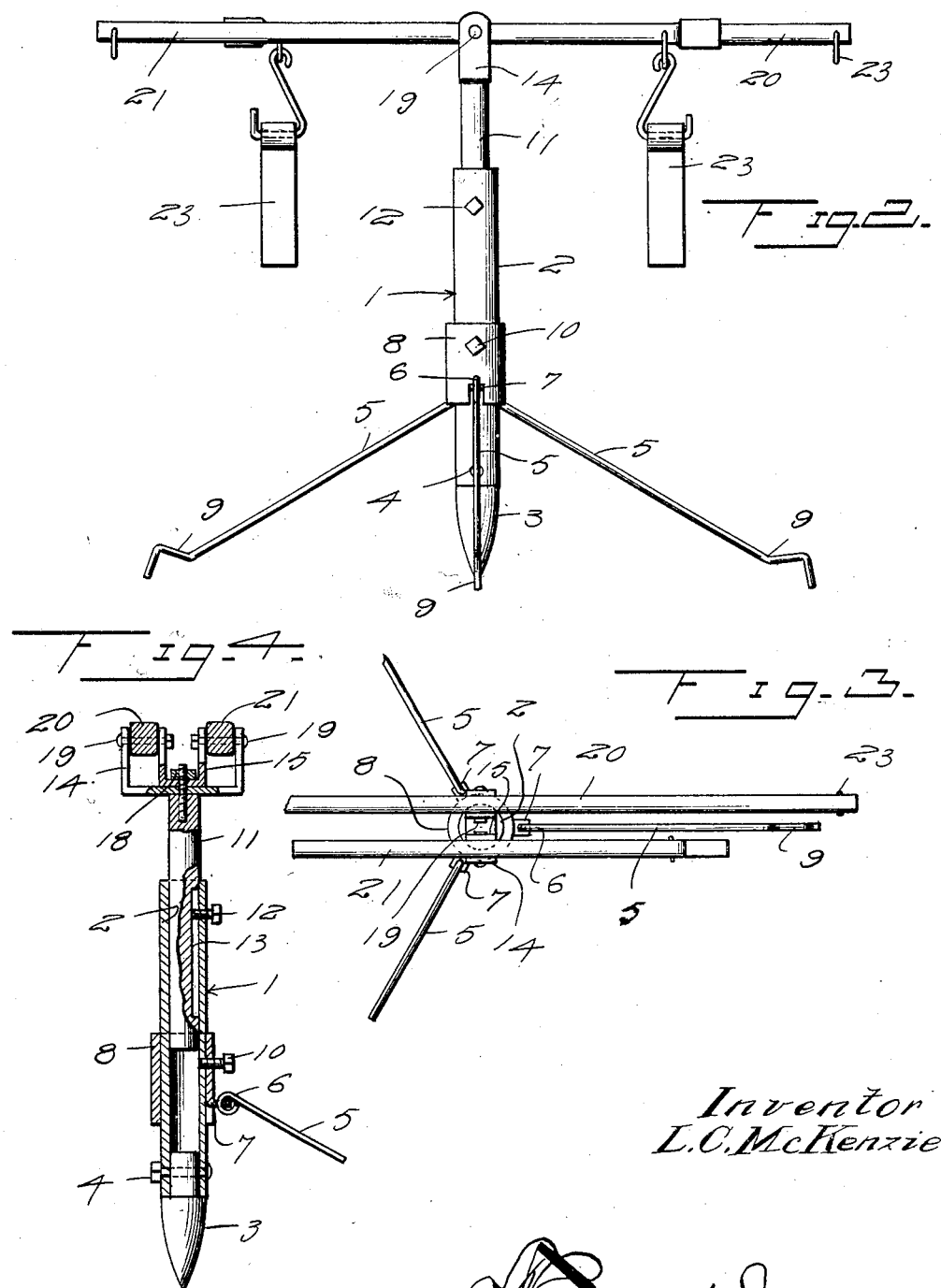

LUKE C. McKENZIE, OF CLINTON, NORTH CAROLINA.

CATTLE-GRAZING POST.

1,350,732.  Specification of Letters Patent.  Patented Aug. 24, 1920.

Application filed January 17, 1920. Serial No. 352,136.

*To all whom it may concern:*

Be it known that I, LUKE C. MCKENZIE, a citizen of the United States, residing at Clinton, in the county of Sampson and State of North Carolina, have invented certain new and useful Improvements in Cattle-Grazing Posts; and I do hereby declare the following to be a full, clear, and exact description of the invention, such as will enable others skilled in the art to which it appertains to make and use the same.

This invention relates to cattle grazing posts and the primary object of the invention is to provide an improved means for picketing cattle to permit the same to graze a limited territory and to effectively prevent the same from wandering.

Another object of the invention is to provide an improved picket post for cattle which is so constructed, that the same can be readily and quickly positioned in the ground and effectively anchored against all strain, so that the displacement thereof is prevented.

A further object of the invention is to provide an improved means for attaching the lead lines secured to the halter on the cow, so as to take up the slack in said line and permit the cow to graze in a circle around the picket post.

A further object of the invention is to provide an improved means for adjusting the anchoring member in relation to the post, so that the same can be regulated according to the depth in which the posts are sunk into the ground.

A further object of the invention is to provide an improved means for adjusting the members to which the picket lines are adapted to be attached.

A still further object of the invention is to provide an improved cattle grazing post of the above character, which is durable and efficient in use, one that is simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, forming a part thereof, in which:

Figure 1 is a view of the improved post showing the same in operation.

Fig. 2 is an enlarged side elevation of the post.

Fig. 3 is a top plan view of the same.

Fig. 4 is a longitudinal section through the improved post.

Fig. 5 is a detail view showing the post in collapsed position.

Referring to the drawing in detail, wherein similar reference characters designate corresponding parts throughout the several views, the numeral 1 generally indicates the improved cattle grazing post, which includes the metallic sleeve 2 having the sharpened penetrating point 3 secured in the lower end of the same by bolts 4. The point 3 permits the post to be quickly and easily inserted in the ground. To hold the post in upright position and against the accidental displacement from the ground, anchoring members 5 are provided and these members are preferably formed of heavy wire or the like and have their upper ends formed to provide eyes 6, which are extended through the ears 7 struck out from the cuff 8, which is adjustably mounted on the sleeve 2. The lower terminals of the anchoring members 5 are bent to provide hook ends 9, to facilitate the insertion of the same in the ground to prevent disarrangement thereof. The cuff 8 is held in its adjusted position by means of a set screw 10 adapted to engage the outer surface of the sleeve to prevent movement thereof. The cuff is adjusted on the post according to the depth in which the post is driven into the ground, so as to permit the members 5 to extend outwardly and around the post for a considerable distance, so as to form a relatively large anchoring space.

The upper end of the sleeve has slidably mounted therein the rod 11, which is also adapted to be adjusted in relation to the sleeve and the same is held in adjusted position by means of a set screw 12 carried by the sleeve. The rod 11 is provided with a longitudinally extending groove 13 which forms a guide way to receive the set screw. By loosening or tightening the screw the post can be readily adjusted and held in the desired position. The upper end of the rod 11 has rotatably mounted thereon the U-shaped members 14 and 15 which are arranged one within the other, as clearly shown in the drawings. The inner U-shaped member 15 is relatively small and the legs thereof are arranged in spaced relation to the legs of the outer U-shaped member 14, the purpose of which will be hereinafter more fully described. The bight portions of the U- shaped member are arranged in abutting relation to one another and the same are provided with alined apertures 16 for rotatably receiving the pin 17, carried by the upper end of the post. The U-shaped members 14 and 15 are held in position by means of a nut 18 which is threaded on the outer end of the pin 17. The arms of the U-shaped members 14 and 15 support pivots 19 on which are mounted the arms 20 and 21. The arms are mounted on the pins intermediate their ends, and the outer ends of the arms are provided with suitable rings 22, by means of which the lead lines of the grazing cattle can be attached thereto. The opposite inner ends of the arms are provided with depending weights 23, which normally hold the opposite end of the arms in a raised position, so as to effectually take up the slack in the lead line and thus prevent the same from being dragged over the ground and twisted in the anchoring member.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize the various minor changes in details of construction, proportion and arrangement of parts may be resorted to, when required without sacrificing any of the advantages of my invention as set forth.

What I claim as new is:

A cattle grazing post comprising a sleeve, a penetrating point secured to one end of the sleeve, a cuff mounted on the sleeve, means for holding the cuff in adjusted position, anchoring arms pivotally carried by the cuff, hooked ends formed on the lower terminal of the arms, a rod adjustably mounted on the upper end of the sleeve, attaching members rotatably carried by the upper end of the rod, arms pivotally secured to the members intermediate their ends, loops attached to one end of the arms and weights attached to the opposite end of the arms, as and for the purpose specified.

In testimony whereof I affix my signature in the presence of two witnesses.

LUKE C. McKENZIE.

Witnesses:
 CYRUS M. FAIRCLOTH,
 WALTER H. FISHER.